(12) United States Patent
von Albedyll et al.

(10) Patent No.: US 11,913,427 B2
(45) Date of Patent: Feb. 27, 2024

(54) ROTOR BLADE FOR A WIND POWER INSTALLATION, AND ASSOCIATED WIND POWER INSTALLATION

(71) Applicant: Wobben Properties GmbH, Aurich (DE)

(72) Inventors: Andreas von Albedyll, Bremen (DE); Dimitrios Bekiropoulos, Aurich (DE)

(73) Assignee: Wobben Properties GmbH, Aurich (DE)

( * ) Notice: Subject to any disclaimer, the term of this patent is extended or adjusted under 35 U.S.C. 154(b) by 22 days.

(21) Appl. No.: 17/385,578

(22) Filed: Jul. 26, 2021

(65) Prior Publication Data
US 2022/0025846 A1 Jan. 27, 2022

(30) Foreign Application Priority Data
Jul. 27, 2020 (DE) .......................... 102020119737.3

(51) Int. Cl.
*F03D 1/06* (2006.01)
*G10K 11/172* (2006.01)

(52) U.S. Cl.
CPC ........... *F03D 1/065* (2013.01); *F03D 1/0641* (2013.01); *F03D 1/0675* (2013.01); *G10K 11/172* (2013.01); *F05B 2240/221* (2013.01); *F05B 2240/30* (2013.01); *F05B 2260/96* (2013.01)

(58) Field of Classification Search
CPC ...... F03D 1/065; F03D 1/3641; F03D 1/0683; F03D 1/0675; F03D 7/0296; F05B 2240/221; F05B 2240/30; F05B 2240/304; F05B 2240/3042; F05B 2260/96; G01K 11/172; Y02E 10/72
See application file for complete search history.

(56) References Cited

U.S. PATENT DOCUMENTS

| | | | |
|---|---|---|---|
| 8,662,854 B1 * | 3/2014 | Salaverry | F03D 1/0675 415/914 |
| 2008/0080977 A1 * | 4/2008 | Bonnet | G10K 11/172 416/229 A |
| 2010/0143151 A1 * | 6/2010 | Kinzie | F03D 1/0675 416/248 |
| 2014/0286784 A1 * | 9/2014 | Singh | F03D 1/0633 416/228 |

(Continued)

FOREIGN PATENT DOCUMENTS

| | | |
|---|---|---|
| DE | 102012102746 A1 | 11/2012 |
| DE | 102014205016 A1 | 9/2015 |

(Continued)

*Primary Examiner* — David E Sosnowski
*Assistant Examiner* — Wayne A Lambert
(74) *Attorney, Agent, or Firm* — Seed IP Law Group LLP

(57) ABSTRACT

Rotor blade for a wind power installation, rotor for a wind power installation, and wind power installation. The disclosure relates in particular to a rotor blade for a wind power installation, having a rotor blade length, having a profile depth established between a leading edge and a trailing edge, and having a profile thickness established between a suction side and a pressure side, wherein the rotor blade has a trailing edge region, which adjoins the trailing edge and extends with a region extent of less than 20%, in particular less than 10%, of the profile depth in the direction of the leading edge, wherein the trailing edge region has at least one acoustic opening.

17 Claims, 8 Drawing Sheets

(56) References Cited

U.S. PATENT DOCUMENTS

2019/0389128 A1* 12/2019 Doolan ................ B29C 64/153

FOREIGN PATENT DOCUMENTS

| EP | 2216545 A2 | 8/2010 |
| EP | 3098436 A1 | 11/2016 |
| WO | 2009/025549 A1 | 2/2009 |
| WO | 2011/157849 A2 | 12/2011 |
| WO | 2014/207015 A1 | 12/2014 |

* cited by examiner

ROTOR BLADE FOR A WIND POWER INSTALLATION, AND ASSOCIATED WIND POWER INSTALLATION

BACKGROUND

Technical Field

The disclosure relates to a rotor blade for a wind power installation, to a rotor for a wind power installation, and to a wind power installation.

Description of the Related Art

Wind power installations are fundamentally known, and they generate electrical power from wind. Wind power installations generally concern so-called horizontal-axis wind power installations, in the case of which the rotor axis is oriented substantially horizontally and the rotor blades sweep through a substantially vertical rotor area. Aside from a rotor arranged at a nacelle, wind power installations generally comprise a tower on which the nacelle with the rotor is arranged so as to be rotatable about a substantially vertically oriented axis. The rotor generally comprises three rotor blades, wherein rotors having fewer or more than three rotor blades are also possible. The rotor blades are slender components, which are commonly produced from fiber-reinforced plastic.

Due to aerodynamic effects at the rotor blades, wind power installations emit noise. In respect of the noise emission of wind power installations, it is generally necessary for legal requirements to be taken into account, and in particular limit values laid down by law should not be exceeded. Furthermore, low noise emission is advantageous for gaining acceptance with persons affected by the noise emission. Therefore, with the development of rotor blades, one of the aims is to design these as far as possible in such a way that the noise emission is low.

BRIEF SUMMARY

Provided is a rotor blade for a wind power installation, a rotor for a wind power installation and a wind power installation that reduce or eliminate one or more of the stated disadvantages. Provided is at least one technique which makes possible low noise emission of rotor blades at wind power installations.

According to a first aspect, provided is a rotor blade for a wind power installation, having a rotor blade length, having a profile depth established between a leading edge and a trailing edge, and having a profile thickness established between a suction side and a pressure side, wherein the rotor blade has a trailing edge region, which adjoins the trailing edge and extends with a region extent of less than 20%, in particular less than 10%, of the profile depth in the direction of the leading edge, wherein the trailing edge region has at least one acoustic opening.

The disclosure is based on the realization that the noise emission arises substantially at the trailing edge of a rotor blade. The inventors have found that, by way of the acoustic opening, the sharp jump in impedance with the impingement on the trailing edge of the fluctuating wall pressure occurring in the boundary layer is mitigated, and consequently lower noise emission occurs. It has moreover been found that the vortex structure is advantageously influenced by the acoustic opening.

The rotor blade preferably extends with the rotor blade length from the rotor blade root to a rotor blade tip. Orthogonally to the direction of the rotor blade length, the rotor blade extends in the direction of the profile depth. The profile depth is established between the leading edge, which faces the wind during operation, and the trailing edge, which faces away from the wind during operation. Orthogonally to the direction of the rotor blade length and orthogonally to the direction of the profile depth, the rotor blade extends in the direction of the profile thickness. Along the profile depth, there is normally established a non-constant profile thickness, which for example increases from the leading edge to a region of maximum profile thickness and decreases again from the region of maximum profile thickness to the trailing edge.

The trailing edge region adjoins the trailing edge of the rotor blade. The trailing edge region is to be understood as being in particular a section of the rotor blade that adjoins the trailing edge. The trailing edge region is formed in particular by a section of the suction side and by a section of the pressure side. Furthermore, the trailing edge region is also formed by the trailing edge as such. The trailing edge region preferably extends in the direction of the rotor blade length, in the direction of the profile depth and/or in the direction of the profile thickness. In particular, the trailing edge region extends with the region extent in the direction of the profile depth. The region extent amounts to less than 20% of the profile depth. In particular, it is preferable for the region extent to amount to less than 10% of the profile depth.

The trailing edge region has the at least one acoustic opening. The acoustic opening is formed for example as a cutout. In particular, it is preferable for the acoustic opening to extend from the suction side to the pressure side and furthermore preferably to be formed as a passage opening. The acoustic opening preferably has a passage axis, which may also be of curved form, which at least has a directional component in the direction of the profile thickness. Furthermore preferably, the axis of the acoustic opening may also have a directional component in the direction of the rotor blade length. Furthermore, it may be advantageous if the axis of acoustic opening has a directional component in the direction of the profile depth. It is furthermore preferable for the trailing edge region to have a plurality of acoustic openings. For example, the trailing edge region may have a porous structure, wherein the porous structure has the plurality of acoustic openings. The porous structure preferably has regularly arranged acoustic openings.

According to a preferred embodiment variant of the rotor blade, it is provided that the acoustic opening is of closable form. The open acoustic opening can lead to a reduction in the aerodynamic efficiency. It is therefore preferred that, in a part-load range, in particular in a predefined power and/or wind-speed range, the acoustic opening is closed, in order to achieve the best possible aerodynamic performance. In particular in the full-load range, when the rated power of the wind power installation has been achieved and, for rotational-speed regulation, the rotor blades are already being pitched, opening of the acoustic opening is preferred, in order to thereby reduce the noise emission at the trailing edge.

A preferred development of the rotor blade is distinguished in that at least one section of the trailing edge region is formed by a suction-side trailing edge element and a pressure-side trailing edge element, which are arranged adjacent to one another in the direction of the profile thickness, and wherein at least one of the trailing edge elements and/or a screen between the trailing edge elements are/is arranged movably, and preferably the at least one acoustic opening is formed by a suction-side passage opening in the suction-side trailing edge element and by a pressure-side passage opening in the pressure-side trailing edge element, wherein the at least one acoustic opening is open in an open position of the movably arranged trailing edge element and is substantially closed in a closed position of the movably arranged trailing edge element, and/or wherein the at least one acoustic opening is open in an open position of the screen and is substantially closed in a closed position of the screen.

The suction-side trailing edge element and/or the pressure-side trailing edge element may be arranged movably. In particular, it is preferred that the trailing edge elements are arranged so as to be movable relative to one another. It is in particular preferred that the trailing edge elements are arranged so as to be movable relative to one another in the direction of the rotor blade length. The trailing edge elements arranged adjacent to one another may be immediately adjacent to one another or else spaced apart from one another. In particular, it is preferred that the trailing edge elements are spaced apart from one another if provision is made of the screen between said trailing edge elements.

The suction-side trailing edge element has the suction-side passage opening, and the pressure-side trailing edge element has the pressure-side passage opening. The suction-side passage opening and the pressure-side passage opening are arranged and formed in such a way that these can form the acoustic opening. For this purpose, the passage openings are preferably arranged and formed so as to be able to form a common passage axis. The at least one acoustic opening is open in the open position of the movably arranged trailing edge element and is substantially closed in a closed position of the movably arranged trailing edge element. The open position may be attained for example in that the suction-side trailing edge element with the suction-side passage opening is positioned in such a way that the suction-side passage opening forms a common axis with the pressure-side passage opening.

Alternatively or additionally, a screen may be formed between the trailing edge elements. The screen preferably has passage openings. The suction-side passage opening and the pressure-side passage opening of the trailing edge elements, with the arrangement of a screen, may at all times be arranged such that these form a common axis and consequently the acoustic opening is open by way of these. The screen between the trailing edge elements and thus also between the passage openings can preferably be moved back and forth and thereby align the passage opening of the screen with the suction-side and pressure-side passage openings, whereby the acoustic opening is open, so that the open position is realized, and be arranged in such a way that the suction-side passage opening is separated from the pressure-side passage opening by the screen, so that the closed position is realized.

In a further preferred development of the rotor blade, it is provided that the movably arranged trailing edge element and/or the screen can be arranged in such a way that the suction-side passage opening and the pressure-side passage opening are partially aligned, in particular in that the movably arranged trailing edge element and/or the screen can be arranged between the open position and the closed position.

Partial alignment of the suction-side and pressure-side passage openings makes lower power loss possible. The setting of the passage openings in such a way that these are partially aligned is preferable in particular in an upper part-load range or in a low full-load range. For realizing said partial alignment, it is preferable for the movably arranged trailing edge element and/or the screen to be arranged in an intermediate position, which is between the open position and the closed position.

According to a further preferred embodiment variant of the rotor blade, it is provided that the movably arranged trailing edge element and/or the screen are/is mounted elastically in such a way that the movably arranged trailing edge element and/or the screen are/is moved from the closed position into the open position by a centrifugal force, wherein the centrifugal force is directed substantially in the direction of the rotor blade length and is preferably induced during operation by a rotation of the rotor blade about a center of rotation.

The movably arranged trailing edge element and/or the screen may for example be mounted by means of a spring. The spring preferably gives rise to a spring force on the movably arranged trailing edge element and/or the screen in the direction of the rotor blade length. As a result of this spring force in the direction of the rotor blade length, with a centrifugal force, the spring is loaded by the movably arranged trailing edge element and/or the screen. The greater the centrifugal force, the more the movably arranged trailing edge element and/or the screen can move. This can lead for example to the acoustic opening not being opened up to a certain rotational speed of the rotor on which the rotor blade is arranged. At higher rotational speeds, the centrifugal force becomes so large that the deflection of the movably arranged trailing edge element and/or the screen becomes so large that the acoustic opening is opened at least partially. The spring force preferably acts counter to the centrifugal force. Since the centrifugal force of a rotor blade arranged on a rotor of a wind power installation is generally directed in the direction of the rotor blade length, it is preferable for the spring force to act in the direction of the rotor blade length.

A further preferred development of the rotor blade is distinguished in that the movably arranged trailing edge element and/or the screen are/is coupled to an actuator which is configured to move the movably arranged trailing edge element and/or the screen between the closed position and the open position.

The actuator is coupled to the movably arranged trailing edge element and/or the screen in such a way that the movably arranged trailing edge element and/or the screen can be moved by means of the actuator. This movement caused by the actuator allows the acoustic opening to be opened and/or closed. Thus, for example, it is also possible for opening and closing of the acoustic opening to be effected independently of an active centrifugal force. Preferably, the rotor blade comprises a control device which is coupled to the actuator. The control device can preferably actuate the actuator on the basis of predetermined parameters in such a way that the acoustic opening is opened and/or closed in a manner dependent on the aforementioned parameters. In particular, it is preferred that the actuator is in the form of a piezoceramic or comprises the latter.

In a further preferred embodiment variant, it is provided that the movably arranged trailing edge element and/or the screen are/is arranged, and preferably the actuator is designed, such that this/these can be moved at high frequency between the closed position and the open position, wherein for example a frequency of 200 Hz is provided. The expression "at high frequency" is to be understood as meaning in particular a frequency between 100 Hz and 2 kHz.

In a further preferred development, it is provided that the at least one acoustic opening is arranged and formed in such a way that particles which have entered the acoustic opening can be removed by way of a centrifugal force.

During operation, a rotor blade is regularly contaminated by particles. For example, numerous insects or plant constituents strike the rotor blade. These particles can settle in the at least one acoustic opening and thereby clog the opening. As a consequence of this, the aforementioned function of reduced noise emission can be less effective or ineffective. Owing to this, it is preferable for the acoustic opening to be formed in such a way that the particle can be thrown out. In particular, it is preferred that this is realized without additional intervention from a user. Therefore, it is particularly preferred that the particle is thrown out by way of the centrifugal force.

Furthermore, it is preferable for the at least one acoustic opening to be of conical form. In particular, it is preferable for the relatively large cross section of the conical acoustic opening to be arranged in a region adjoining the pressure side and/or the suction side. In particular, it is preferable for the acoustic opening to be of double-conical form, such that, in the direction of the pressure side and the direction of the suction side, there is in each case a relatively large cross section and, between the pressure side and the suction side, there is a relatively small cross section. As a consequence of this, a particle can advantageously be removed from the acoustic opening by way of a centrifugal force.

In a further preferred embodiment variant, it is provided that the at least one acoustic opening has a passage direction oriented in the direction of the profile thickness and preferably in the direction of the rotor blade length and is furthermore preferably V-shaped.

In a further preferred development of the rotor blade, it is provided that the at least one acoustic opening has a first entry and a second entry, wherein the acoustic opening extends with a passage direction between the first entry and the second entry, wherein the first entry is arranged on the pressure side and the second entry is arranged on the suction side and preferably the passage direction is substantially straight or substantially V-shaped with directional components in the direction of the profile thickness and/or the direction of the rotor blade length, and/or the first entry and the second entry are arranged on the pressure side or on the suction side and the passage direction is curved, in particular is semicircular or semi-oval.

Furthermore, it may be preferable for the trailing edge region, having the at least one acoustic opening, to be produced by an additive method. In particular the aforementioned porous structure, which the trailing edge region preferably has, can advantageously be produced by an additive method. Furthermore, an advantage in the additive production method is that the plurality of acoustic openings may be arranged in such a way that particles can be thrown out by way of a centrifugal force.

According to a further aspect, provided is a rotor for a wind power installation that has a rotor blade according to one of the preceding embodiment variants.

According to a further aspect, provided is a wind power installation having a rotor according to the preceding aspect and/or having a rotor blade according to one of the above-described embodiment variants.

For further advantages, embodiment variants and embodiment details of the further aspects and their possible developments, reference is also made to the description given above concerning the corresponding features and developments of the rotor blade.

BRIEF DESCRIPTION OF THE SEVERAL VIEWS OF THE DRAWINGS

Preferred exemplary embodiments will be discussed by way of example on the basis of the appended figures. In the figures.

In the figures, identical or substantially functionally identical or similar elements are denoted by the same reference signs.

DETAILED DESCRIPTION

Figure 1:
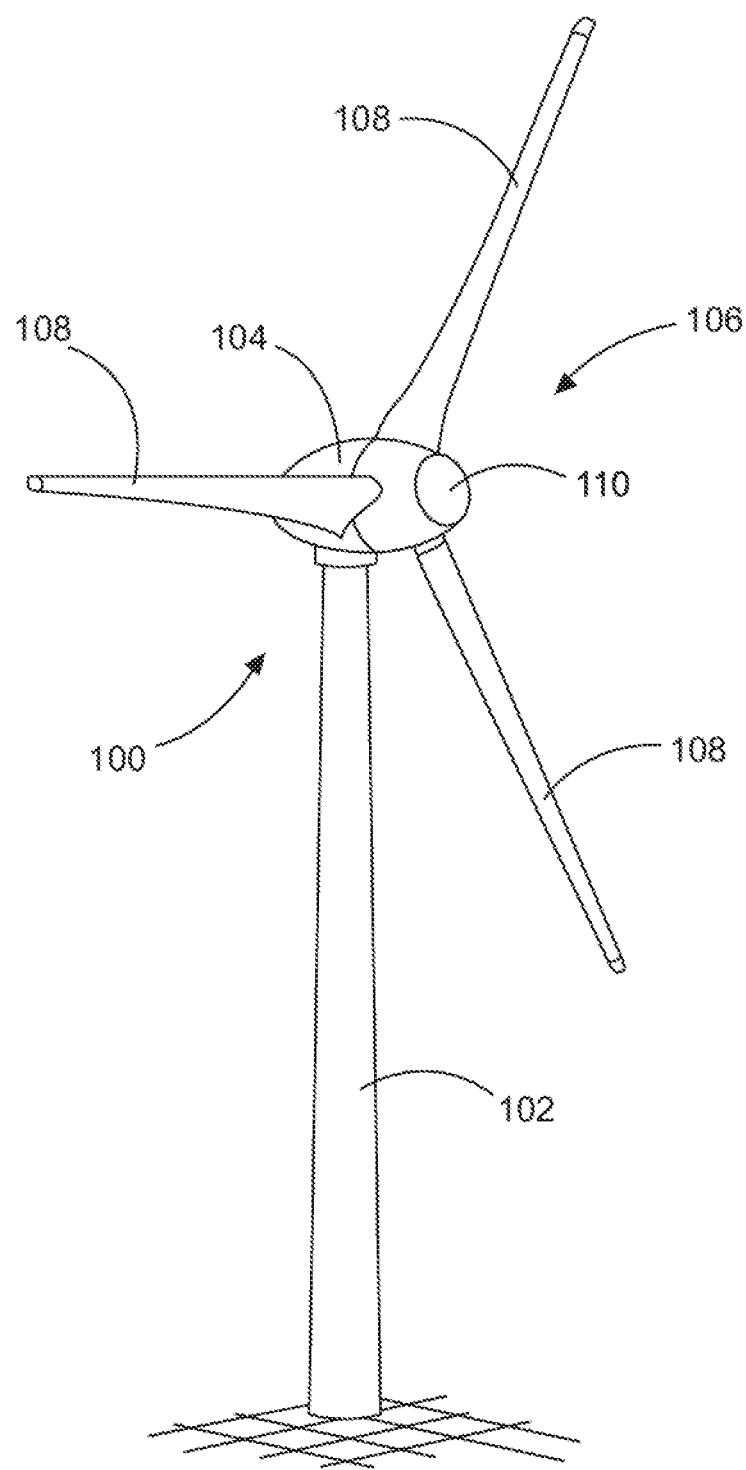
FIG. 1 shows a schematic three-dimensional view of a wind power installation.

FIG. 1 shows a schematic three-dimensional view of a wind power installation 100. The wind power installation 100 has a tower 102 and a nacelle 104 on the tower 102. An aerodynamic rotor 106 having three rotor blades 108 and having a spinner 110 is provided on the nacelle 104. During the operation of the wind power installation 100, the aerodynamic rotor 106 is set in rotational motion by the wind and thereby also rotates an electrodynamic rotor or runner of a generator, which is coupled directly or indirectly to the aerodynamic rotor 106. The electric generator is arranged in the nacelle 104 and generates electrical energy.

At least one of the rotor blades 108 has a trailing edge region, which adjoins a trailing edge and extends with a region extent of less than 20%, in particular less than 10%, of the profile depth in the direction of the leading edge. The trailing edge region has at least one acoustic opening.

Figure 2:
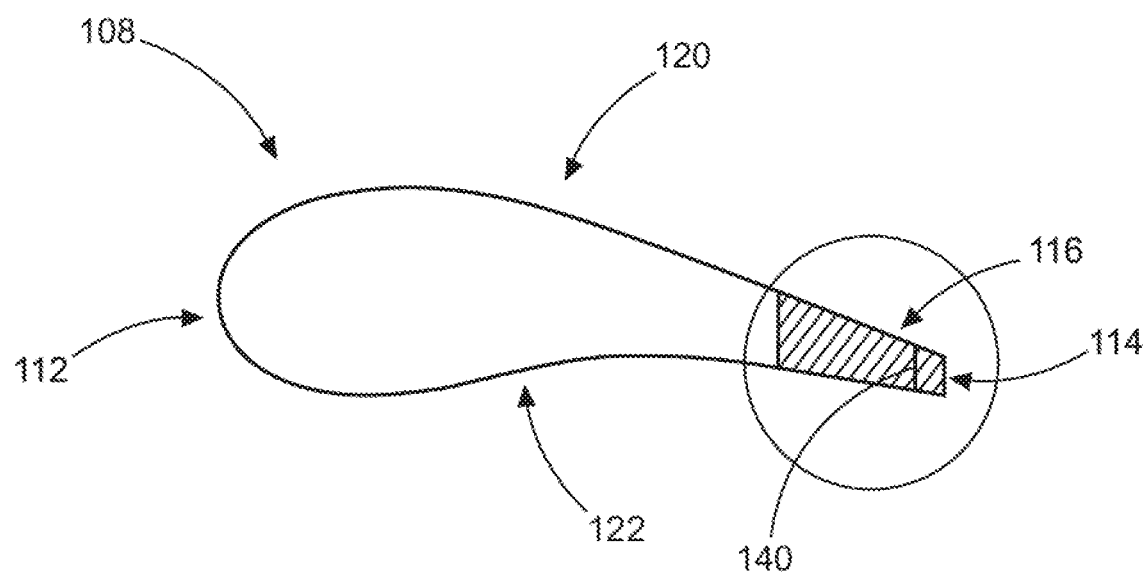
FIG. 2 shows a schematic two-dimensional view of a profile section.
Figure 3:
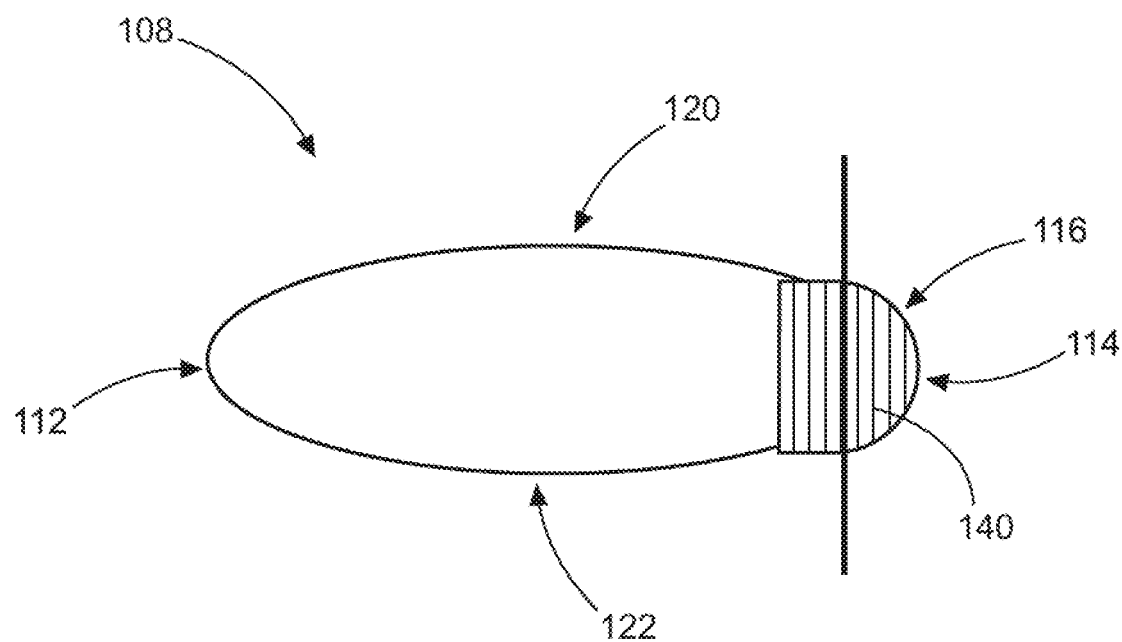
FIG. 3 shows a further schematic two-dimensional view of a profile section.
Figure 8:
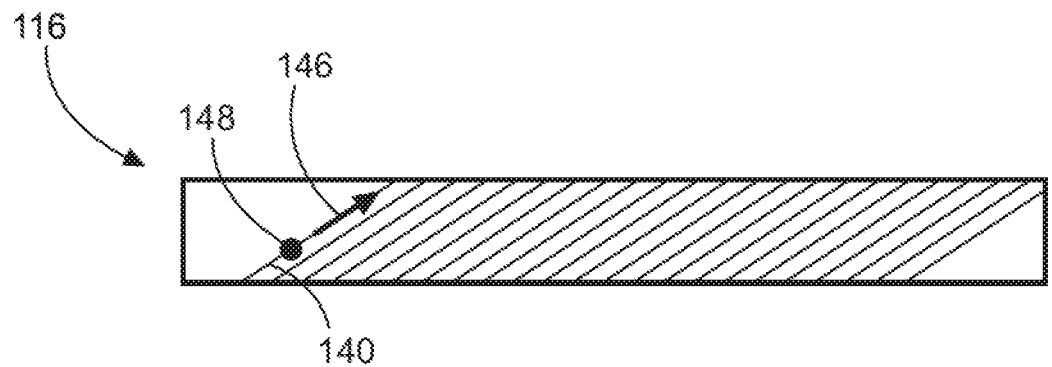
FIG. 8 shows a schematic two-dimensional sectional view of a trailing edge region.
Figure 9:
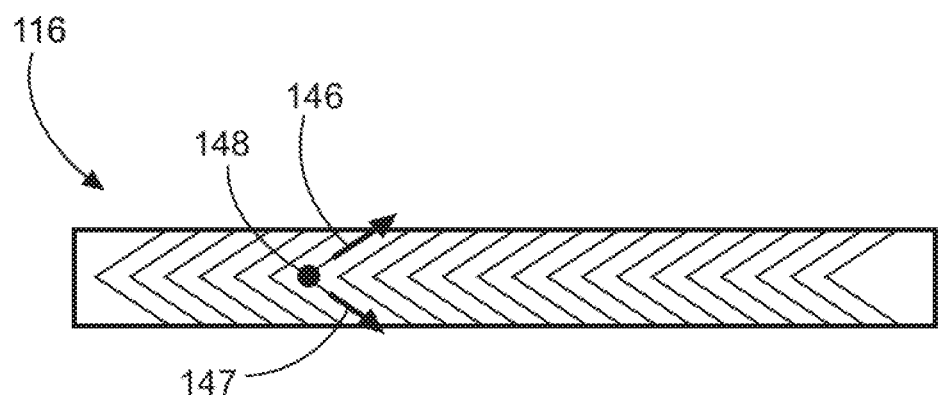
FIG. 9 shows a further schematic two-dimensional sectional view of a trailing edge region.
Figure 10:
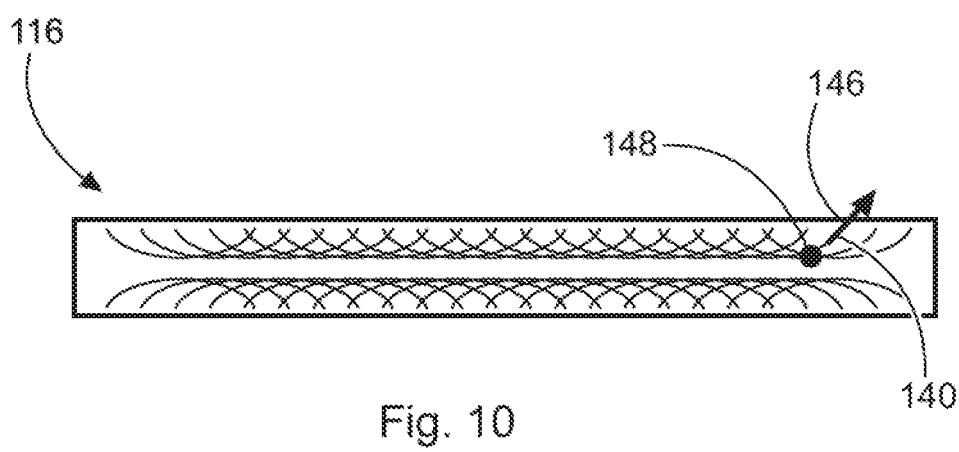
FIG. 10 shows a further schematic two-dimensional sectional view of a trailing edge region.

FIG. 2 shows a schematic two-dimensional view of a profile section. The rotor blade 108 extends with a profile depth between the leading edge 112 and the trailing edge 114. A profile thickness is established between the suction side 120 and the pressure side 122. The rotor blade has a trailing edge region 116 adjoining the trailing edge 114. The trailing edge region 116 has an acoustic opening 140. FIG. 3 shows a further profile section of the rotor blade 108. The trailing edge region 116 has in particular a plurality of acoustic openings 140. The acoustic openings extend from the suction side 120 as passage openings to the pressure side 122. The orientation of the acoustic openings 140, in particular the passage axis thereof, is oriented substantially parallel to the profile thickness. Exemplary sections along an axis A are shown in FIGS. 8 to 10.

Figure 4:
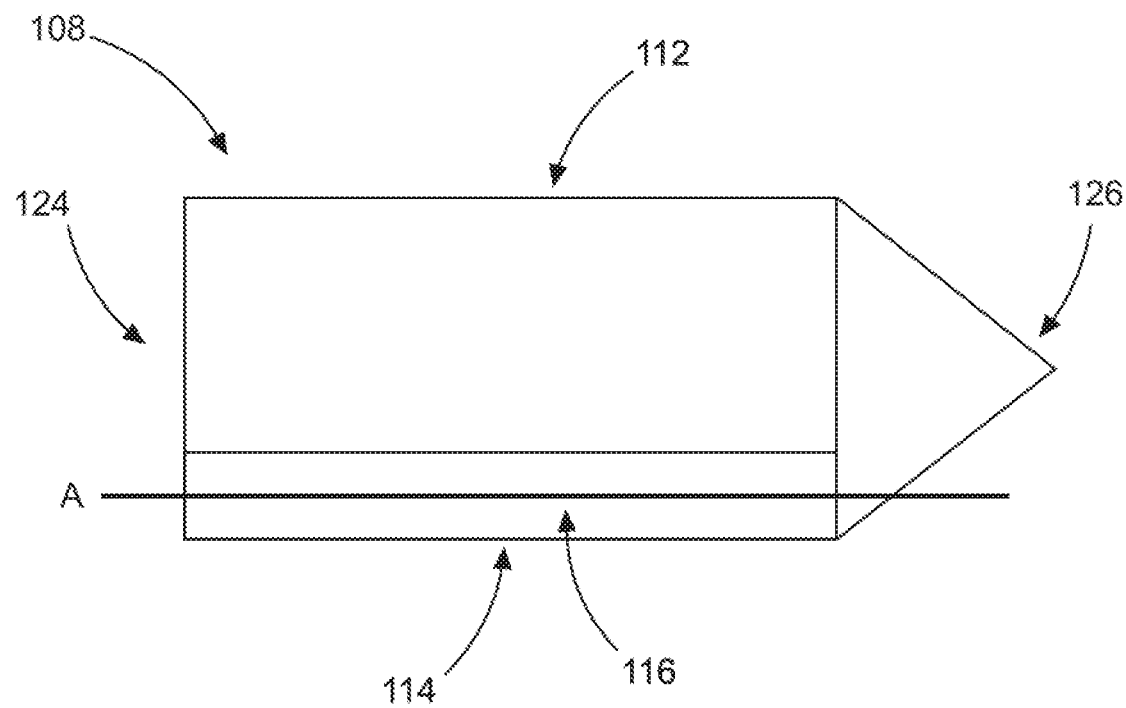
FIG. 4 shows a schematic two-dimensional view of the rotor blade shown in FIG. 1.

FIG. 4 shows a schematic two-dimensional view of the rotor blade 108 shown in FIG. 1. The rotor blade 108 extends with a rotor blade length from a blade root 124 to a blade tip 126. Orthogonally thereto, the rotor blade 108 extends with the profile depth from the leading edge 112 to the trailing edge 114. Proceeding from the trailing edge 114, the trailing edge region 116 extends in the direction of the leading edge 112. This extent in the direction of the leading edge 112 occurs with a region extent which amounts to less than 20% of the profile depth. In the direction of the rotor blade length, the trailing edge region extends with a trailing edge region longitudinal extent which is smaller than the rotor blade length. The axis A is also shown here, along which axis exemplary sections in FIGS. 8 to 10 extend.

Figure 5:
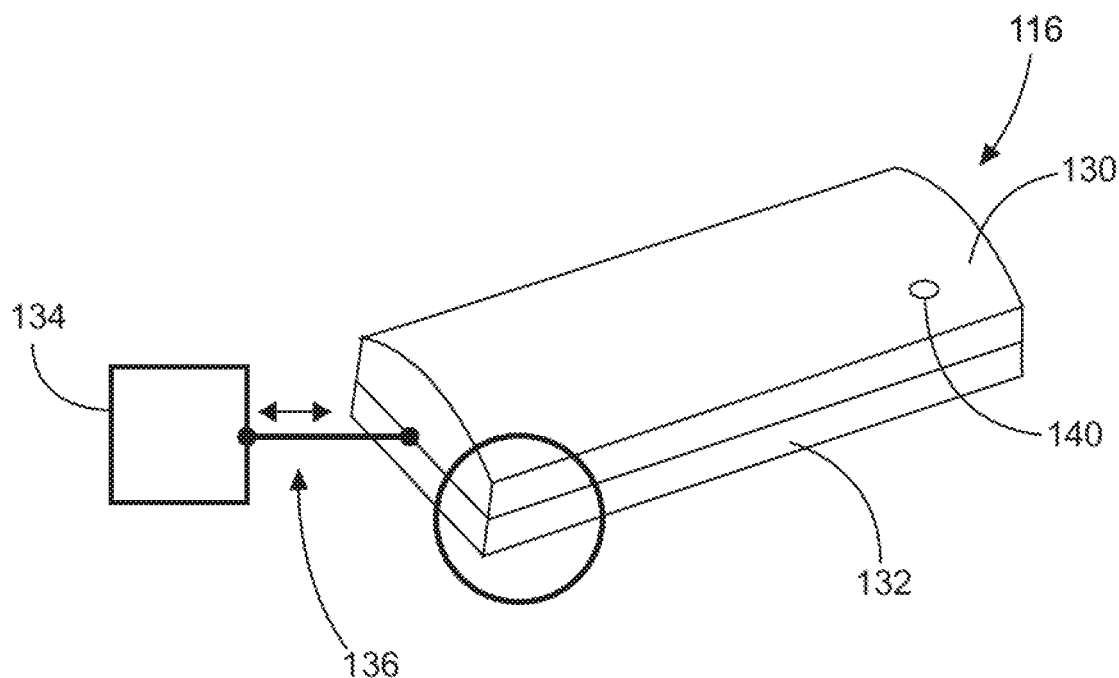
FIG. 5 shows a schematic three-dimensional view of a trailing edge region.

FIG. 5 shows a schematic three-dimensional view of a trailing edge region 116. The trailing edge region 116 is formed by a suction-side trailing edge element 130 and a pressure-side trailing edge element 132. The suction-side trailing edge element 130 and the pressure-side trailing edge element 132 are arranged adjacent to one another in the direction of the profile thickness. The acoustic opening 140 passes through the trailing edge elements 130, 132. For this purpose, the suction-side trailing edge element 130 has a suction-side passage opening and the pressure-side trailing edge element 132 has a pressure-side passage opening.

If said passage openings are aligned with one another, the acoustic opening 140 is open. If the passage openings are not aligned with one another, the acoustic opening 140 is closed. In order to make possible closing and opening of the acoustic opening 140, the suction-side trailing edge element 130 is arranged movably. Furthermore, the suction-side trailing edge element 130 is coupled to an actuator 134 via a coupling element 136. By means of the actuator 134, the suction-side trailing edge element 130 can be moved back and forth in the direction of the rotor blade length. The back-and-forth movement of the suction-side trailing edge element 130 results in the suction-side passage opening likewise being moved. Consequently, by means of the actuator 134, it is possible to set whether the suction-side passage opening is aligned with the pressure-side passage opening and the acoustic opening 140 is thus open, or whether the passage openings are not aligned with one another and the acoustic opening 140 is thus closed. By way of the movement of the suction-side trailing edge element 130, this is moved back and forth between an open position and a closed position.

Figure 6:
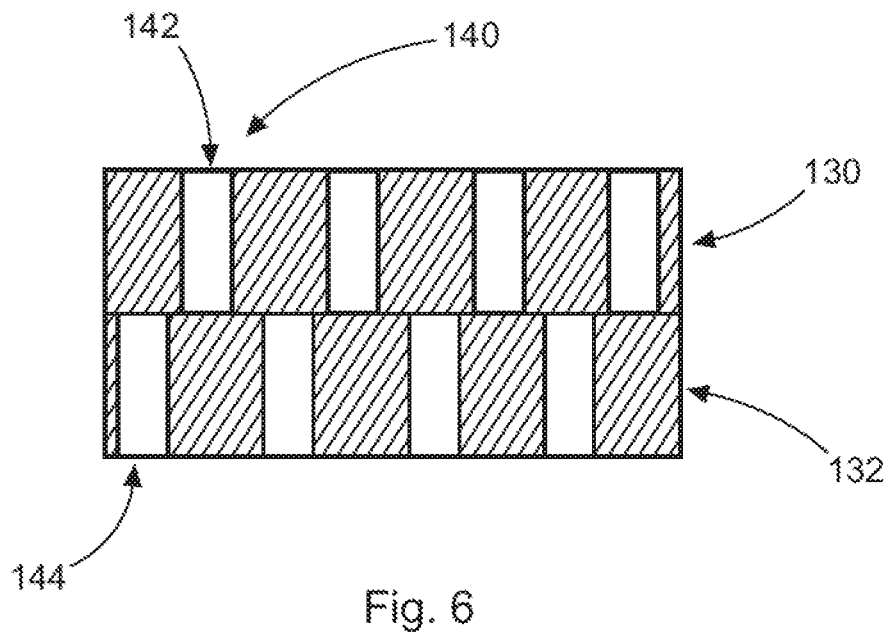
FIG. 6 shows a schematic two-dimensional detail view of acoustic openings in a trailing edge region in a closed position.
Figure 7A:
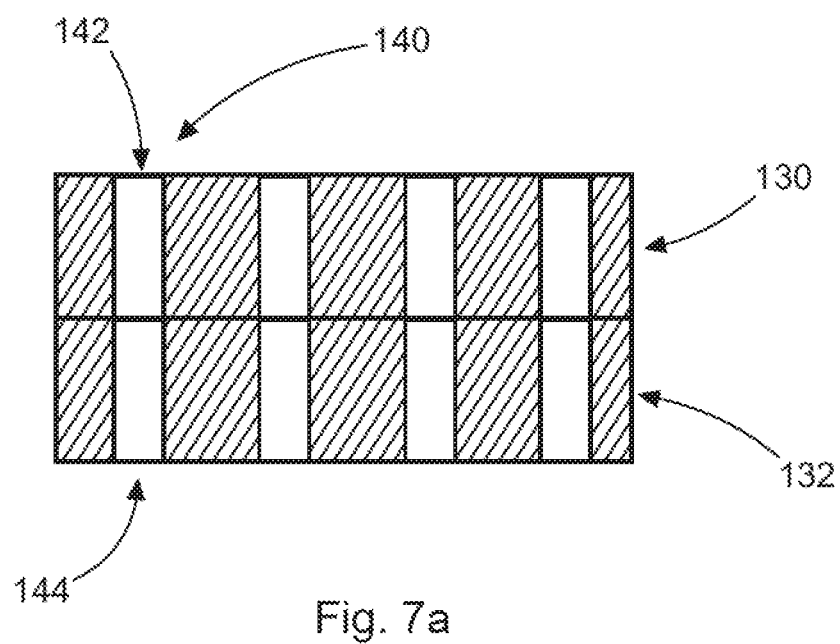
FIGS. 7a, 7b, and 7c show a schematic two-dimensional view of acoustic openings in a trailing edge region in an open position, with a screen in a closed position, and with a screen in an open position, respectively.

FIGS. 6 and 7a illustrate the function of the open position and of the closed position. The acoustic opening 140 is formed by the suction-side passage opening 142 and the pressure-side passage opening 144. In the closed position, which is illustrated in FIG. 6, the suction-side passage opening 142 does not share a common passage axis with the pressure-side passage opening 144. The acoustic opening 140 is therefore closed.

In FIG. 7a, the suction-side trailing edge element 130 has been displaced in such a way that the suction-side passage opening 142 is aligned with the pressure-side passage opening 144 and shares a common passage axis therewith. Consequently, the acoustic opening 140 is open and is thus in an open position.

Figure 7B:
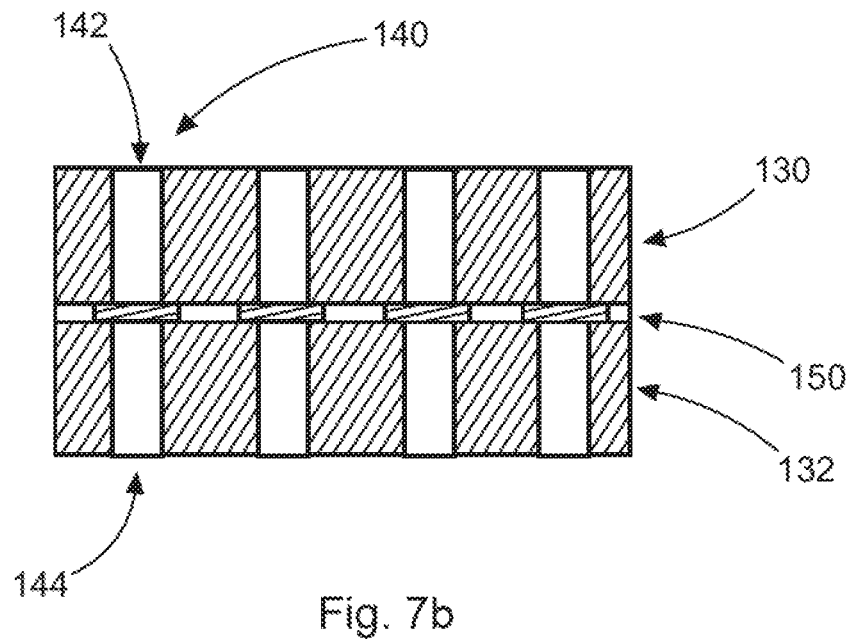
Figure 7C:
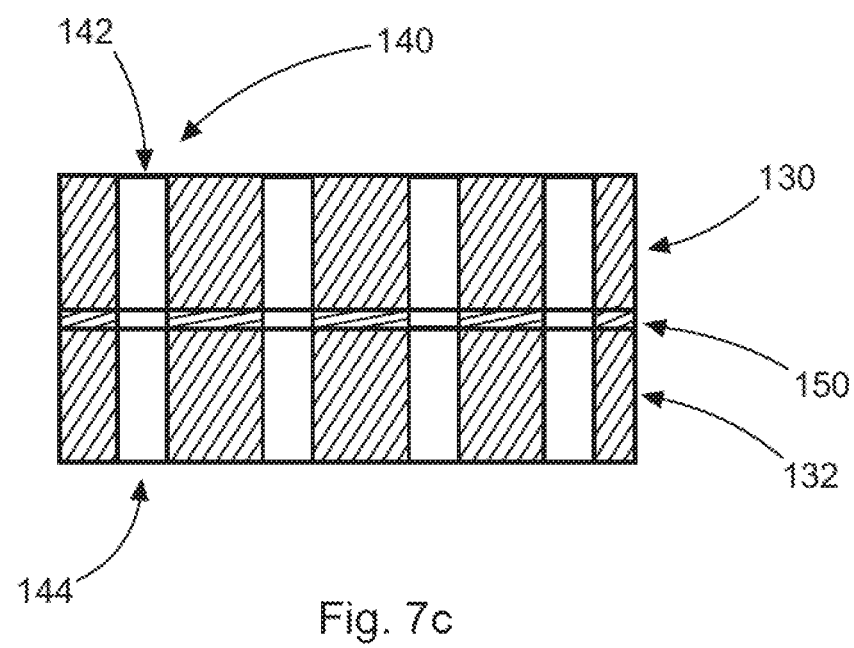

A screen 150 may be formed between the trailing edge elements. The screen 150 preferably has passage openings. The suction-side passage opening and the pressure-side passage opening of the trailing edge elements, with the arrangement of a screen, may at all times be arranged such that these form a common axis and consequently the acoustic opening is open by way of these. The screen 150 between the trailing edge elements and thus also between the passage openings can preferably be moved back and forth and thereby align the passage opening of the screen with the suction-side and pressure-side passage openings, whereby the acoustic opening is open, so that the open position is realized as shown in FIG. 7c, and be arranged in such a way that the suction-side passage opening is separated from the pressure-side passage opening by the screen, so that the closed position is realized as shown in FIG. 7b.

FIGS. 8 to 10 illustrate different forms of the acoustic openings 140 in a cross section along the axes A in FIGS. 3 and 4. FIG. 8 shows a passage opening with a straight passage axis which has directional components in the direction of the rotor blade length and the direction of the profile thickness. In FIG. 9, the acoustic opening 140 is V-shaped, in each case also with directional components in the direction of the rotor blade length and the direction of the rotor blade thickness. Due to the form of these acoustic openings 140, a particle 148 can be thrown out of the acoustic opening 140 by a centrifugal force in a centrifugal force direction 146, 147. The acoustic openings 140 shown in FIG. 10 each have entries and exits which are arranged on one side, for example the pressure side.

Figure 11:
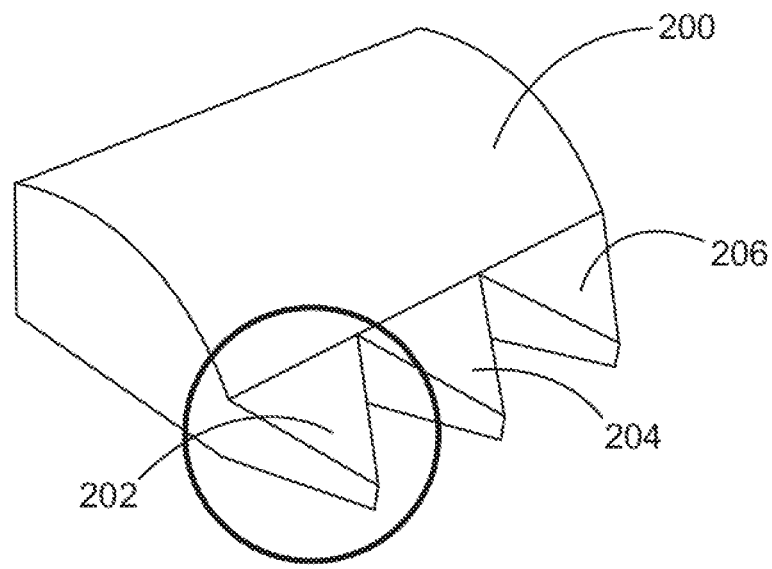
FIG. 11 shows a schematic three-dimensional view of a trailing edge region.
Figure 12:
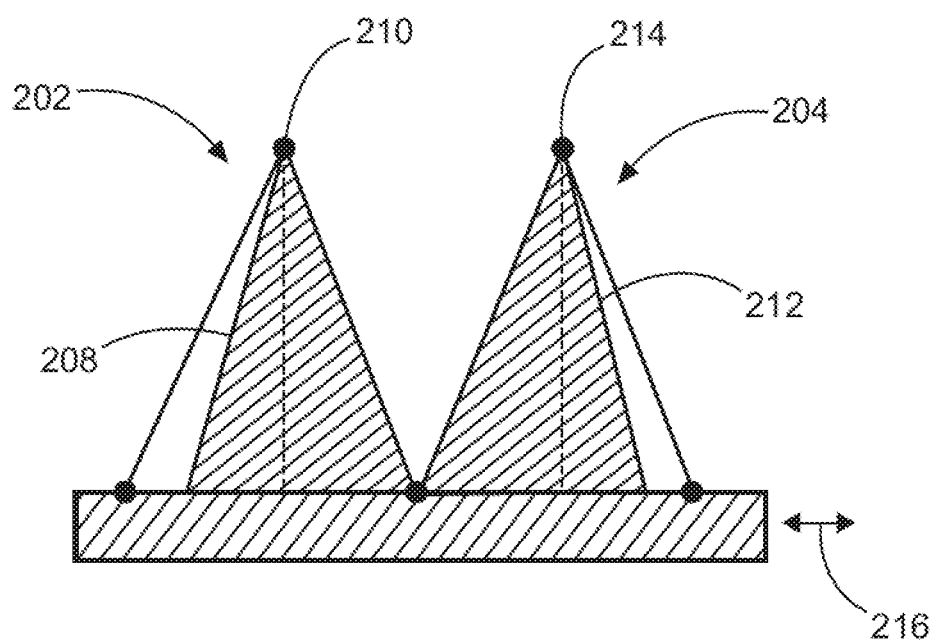
FIG. 12 shows a detail view of the profile elements shown in FIG. 11.
Figure 13:
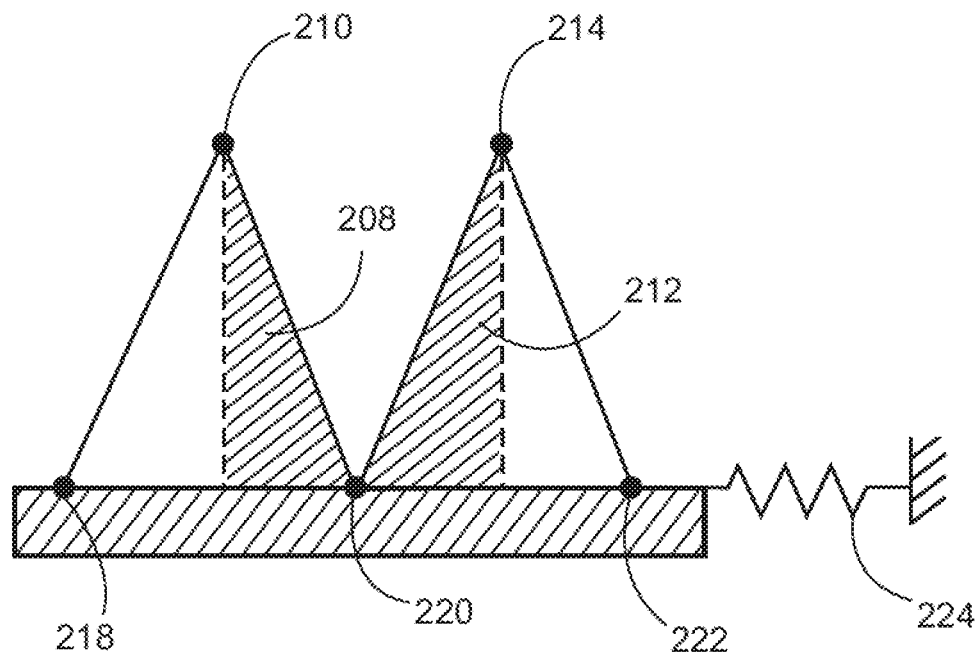
FIG. 13 shows a schematic two-dimensional view of the profile elements shown in FIG. 12.

FIG. 11 shows a schematic three-dimensional view of a trailing edge region. The trailing edge segment 200 has a first profile element 202, a second profile element 204 and a third profile element 206. In FIG. 12, it is shown that the first profile element 202 has a first movable segment 208. The first movable segment 208 is arranged so as to be movable at the first center of rotation 210. The second profile element 204 has, analogously to the first profile element 202, a second movable segment 212 with a second center of rotation 214. Due to the centers of rotation, the movable segments 208, 212 can be moved in the direction of movement 216. This arrangement allows the width of the profile elements 202, 204, 206 to be enlarged. This is advantageously also achieved in that the first profile element 202 is arranged on a fixed bearing 218 and the further bearing points 220, 222 are arranged displaceably, as is shown in particular in FIG. 13. The system is furthermore realized in that the profile elements 202, 204, 206 are coupled to a spring element 224.

At low wind speeds or rotational speeds, it is still the case that no large centrifugal force acts, and the spring force of the spring element 224 can compensate the centrifugal force and holds the profile elements so firmly that a large region of overlap exists at the teeth and the ratio width to length of the segments is still relatively small. If the wind speed increases, the rotational speed increases and, as a consequence, the centrifugal force increases. Since the profile elements are fixed on one side, a force acts on the segments and the teeth are drawn widthwise.

The noise-reduction capability of the profile elements 202, 204, 206 can thus be adapted during operation, with the result that the efficiency range is increased or, in certain speed ranges, the noise emission of the installation is influenced. In particular, in a lower speed range, it is possible to work with a different geometry than at the rated power. Here, it is particularly preferably the case that the spring force of the exemplary spring element 224 is matched to the operating characteristic curve such that, according to requirement, the serration width can be adapted according to the acoustically optimum width via the wind speed. In this region, the acoustic opening is the region remaining free between the profile elements 202, 204, 206, which varies as the geometry of the profile elements 202, 204, 206 varies.

Figure 14:
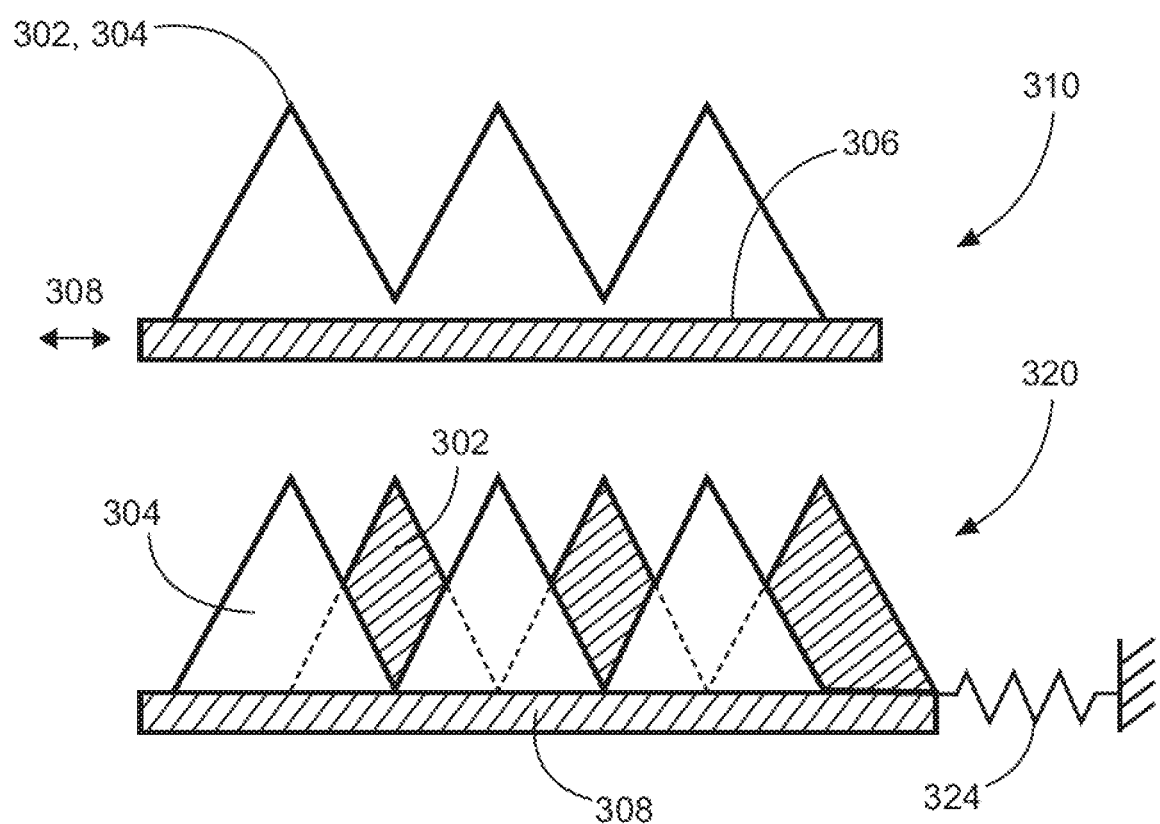
FIG. 14 shows schematic two-dimensional views of a further example of profile elements.

FIG. 14 shows two schematic two-dimensional views of profile elements which can interact with all of the trailing edge segments described and form a further example of acoustic openings.

The profile elements 302, 304 are designed as a multilayer construction, wherein the layers of the profile elements 302, 304 are displaceable relative to one another along a direction 308, whereby different geometries are obtained. In this example, each of the profile elements 302, 304 has a plurality of serrations. In other embodiments, the individual serrations may also be formed as individual profile elements. The displacement of the profile elements 302, 304 may be controlled passively, but also actively. In the passive case, just as in FIGS. 12 and 13, at the spanwise end of at least one of the profile elements 302, 304, there are situated elastic elements, a spring element 324 on the profile element 302 in this example. The force on the spring element 324 varies according to rotational speed, and the profile elements 302, 304, driven by the centrifugal force, can move outwards and work against a spring force. In this case, the geometry of the profile elements 302, 304 and the elastic stiffness of the spring element 324 are preferably matched to one another.

In the active case, instead of the elastic elements, actuators, such as for example piezo actuators, which actively control the movement of the profile elements, are installed. In this way, it is possible to actively influence the noise emission, and thus achieve a desired noise profile, in the operating range of the wind power installation.

A preferred configuration of the profile elements 302, 304 is, as shown in FIG. 14, a construction from segments of, by way of example, three serrations, which are connected to one another at the serration base and are mounted displaceably on a rail 306. FIG. 14 shows a state 320 when the wind power installation is starting up, or at low rotational speeds, in which the profile elements 302 and 304 are displaced in relation to one another. The layer of the profile element 302 is displaced when the rotational speed is increased, such that a state 310 in which the layer of the profile element 302 is situated so as to be congruent with the layer of the profile element 304—in particular at the rated power—is established.

REFERENCE SIGNS

100 Wind power installation
102 Tower
104 Nacelle
106 Rotor
108 Rotor blades
110 Spinner
112 Leading edge
114 Trailing edge
116 Trailing edge region
140 Acoustic opening
120 Suction side
122 Pressure side
124 Blade root
126 Blade tip
130 Suction-side trailing edge element
132 Pressure-side trailing edge element
134 Actuator
136 Coupling element
142 Suction-side passage opening
144 Pressure-side passage opening
147 Centrifugal force direction
146 Centrifugal force direction
148 Particle
200 Trailing edge segment
202 First profile element
204 Second profile element
206 Third profile element
208 First movable segment
210 First center of rotation
212 Second movable segment
214 Second center of rotation
216 Direction of movement
218 Fixed bearing
220, 222 Displaceable bearing points
224 Spring element
302, 304 Profile element
306 Rail
308 Direction
310 State
320 State
324 Spring element The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade for a wind power installation, comprising:
   a rotor blade body having:
      a rotor blade length,
      a profile depth between a leading edge and a trailing edge,
      a profile thickness between a suction side and a pressure side, and
      a trailing edge region that adjoins the trailing edge and extends with a region extent of less than 20% of the profile depth in a direction of the leading edge,
   wherein the trailing edge region has at least one acoustic opening,
   wherein at least one section of the trailing edge region is formed by a suction-side trailing edge element and a pressure-side trailing edge element, which are arranged adjacent to one another in a direction of the profile thickness, and wherein at least one of the trailing edge elements and/or a screen between the trailing edge elements are/is arranged movably,
   wherein the at least one acoustic opening is open in an open position of the movably arranged trailing edge element and is substantially closed in a closed position of the movably arranged trailing edge element, and/or
   wherein the at least one acoustic opening is open in an open position of the screen and is substantially closed in a closed position of the screen.

2. The rotor blade according to claim 1, wherein the at least one acoustic opening is closable.

3. The rotor blade according to claim 1, wherein the at least one acoustic opening is formed by a suction-side passage opening in the suction-side trailing edge element and by a pressure-side passage opening in the pressure-side trailing edge element.

4. The rotor blade according to claim 3, wherein the movably arranged trailing edge element and/or the screen are configured to be arranged in such a way that the suction-side passage opening and the pressure-side passage opening are partially aligned.

5. The rotor blade according to claim 4, wherein the movably arranged trailing edge element and/or the screen are configured to be arranged between the open position and the closed position.

6. The rotor blade according to claim 1, wherein the movably arranged trailing edge element and/or the screen are mounted elastically in such a way that the movably arranged trailing edge element and/or the screen are moved from the closed position into the open position by a centrifugal force, wherein the centrifugal force is directed substantially in a direction of the rotor blade length and is induced during operation by a rotation of the rotor blade about a center of rotation.

7. The rotor blade according to claim 1, wherein the movably arranged trailing edge element and/or the screen are coupled to an actuator, wherein the actuator is configured to move the movably arranged trailing edge element and/or the screen between the closed position and the open position.

8. The rotor blade according to claim 7, wherein the actuator is a piezoceramic actuator.

9. The rotor blade according to claim 7, wherein the actuator is configured to move at a frequency of 200 Hz.

10. A rotor blade for a wind power installation, comprising:
   a rotor blade body having:
      a rotor blade length,
      a profile depth between a leading edge and a trailing edge,
      a profile thickness between a suction side and a pressure side, and
      a trailing edge region that adjoins the trailing edge and extends with a region extent of less than 20% of the profile depth in a direction of the leading edge,
   wherein the trailing edge region has at least one acoustic opening, and
   wherein the at least one acoustic opening is arranged and formed in such a way that particles that enter the acoustic opening are removable by way of a centrifugal force.

11. A rotor blade for a wind power installation, comprising:
   a rotor blade body having:
      a rotor blade length,
      a profile depth between a leading edge and a trailing edge,
      a profile thickness between a suction side and a pressure side, and
      a trailing edge region that adjoins the trailing edge and extends with a region extent of less than 20% of the profile depth in a direction of the leading edge,
   wherein the trailing edge region has at least one acoustic opening, and
   wherein the at least one acoustic opening is of conical form.

12. The rotor blade according to claim 1, wherein the at least one acoustic opening has a passage direction oriented in a direction of the profile thickness.

13. The rotor blade according to claim 1, wherein the at least one acoustic opening has a first entry and a second entry, wherein the at least one acoustic opening extends with a passage direction between the first entry and the second entry,
   wherein the first entry is arranged on the pressure side and the second entry is arranged on the suction side.

14. The rotor blade according to claim 1, wherein the trailing edge region, having the at least one acoustic opening, is produced by an additive method.

15. The rotor blade according to claim 1, wherein the region in which the trailing edge region extends is less than 10% of the profile depth in the direction of the leading edge.

16. A rotor for a wind power installation, comprising the rotor blade according to claim 1.

17. A wind power installation comprising the rotor according to claim 16.

* * * * *